United States Patent [19]

Sandreid

[11] Patent Number: 4,912,817
[45] Date of Patent: Apr. 3, 1990

[54] GRIPPING DEVICE FOR AN ELONGATED FLEXIBLE MEMBER

[75] Inventor: Alf J. Sandreid, Copenhagen, Denmark

[73] Assignee: Sophus Berendsen Marine A/S, Copenhagen, Denmark

[21] Appl. No.: 300,797

[22] Filed: Jan. 23, 1989

[30] Foreign Application Priority Data

Jan. 21, 1988 [DK] Denmark ................. 278/88

[51] Int. Cl.$^4$ ............................................. F16G 11/10
[52] U.S. Cl. ........................... 24/132 R; 24/132 WL; 24/134 R
[58] Field of Search ......... 24/132 R, 132 WL, 134 R, 24/134 KB, 134 L, 134 KA, 133

[56] References Cited

U.S. PATENT DOCUMENTS

| | | | |
|---|---|---|---|
| 842,329 | 1/1907 | McClean | 24/134 R |
| 1,410,162 | 3/1922 | Cadwell | 24/134 R |
| 1,642,874 | 9/1927 | Coon . | |
| 1,809,566 | 6/1931 | Ott | 24/134 R |
| 2,001,541 | 5/1935 | O'Russa . | |
| 2,087,649 | 7/1937 | Magee . | |
| 2,322,651 | 6/1943 | MacChesney | 24/134 R |
| 2,942,315 | 6/1960 | Johnson | 24/134 R |
| 3,017,678 | 1/1962 | Christensen . | |
| 4,465,011 | 8/1984 | Merry | 24/134 R |
| 4,541,149 | 9/1985 | Jensen | 24/132 R |
| 4,669,582 | 6/1987 | Sandreid | 24/132 WL |

FOREIGN PATENT DOCUMENTS 147848  6/1985  Denmark .

*Primary Examiner*—Victor N. Sakran
*Attorney, Agent, or Firm*—Dennison, Meserole, Pollack & Scheiner

[57] ABSTRACT

A gripping device for selectively locking and releasing a flexible member, such as a rope, which may be moved over a guide surface, comprises a lever which may be swung about an axis and which is mounted in a frame. An engaging member is swingably mounted on the lever, and by means of an operating handle on which an eccentric cooperating with the lever is mounted, the lever may be moved between a locking position (FIG. 1) and a releasing position (FIG. 2). By movement of the operating handle in a direction towards and beyond the locking position a force-transmitting projection formed on the operating handle may be brought into direct engagement with an abutment surface on the engaging member, whereby a particularly strong and quick locking of the flexible member may be performed.

6 Claims, 1 Drawing Sheet

GRIPPING DEVICE FOR AN ELONGATED FLEXIBLE MEMBER

BACKGROUND OF THE INVENTION

1. Field of the Invention

The invention relates to a gripping device for selectively locking and releasing an elongated flexible member, such as a rope, extending therethrough.

Such griping devices are used, for example, in sailing ships and elsewhere, where a tope or a line on which a pulling force is exerted is to be releasably held. A gripping device of said type may thus be used in connection with capstans, winches, tackles or similar pulling mechanisms which may, for example, be used for hauling in sails.

2. Description of Prior Art

A griping device of the type mentioned above is known, for example, from U.S. patent specification No. 4,541,149. In this known structure the operating device is constituted by an eccentric which is provided with an operating handle, and which cooperates with the lever and is movable between two stable positions, a releasing position and a locking position, respectively. Because the engaging member is swingably or otherwise movably mounted on the lever, the engaging member, in its engaging position corresponding to the locking position of the operating device, will be able to compensate for any variations in thickness of the rope in connection with which the gripping device is used. In the known structure it is thus the pulling force exerted on the rope and being transmitted to the engaging member via frictional forces, which ensures that this engaging member is moved into sufficiently strong engagement with the rope for holding the rope when the operating device is in its locking position.

In the known locking device described above, however, the rope will slide a certain distance before the engaging member is moved into such a position that the rope may be held, and it has proved that in case of large pulling forces on the rope the known gripping device may not succeed in holding the rope efficiently.

GENERAL DESCRIPTION OF THE INVENTION

The invention provides a gripping device of the type mentioned above and so formed that it can hold a rope, a line or a similar elongated flexible member transmitting a large pulling force, more efficiently than the known gripping device.

Thus, the present invention provides a gripping device for selectively locking and releasing an elongated flexible member, such as a rope, extending therethrough, said device comprising a frame defining a guide surface for guiding the flexible member, a lever which is swingably mounted in the frame around an axis, an engaging member which is movably mounted on said lever at a location spaced from said axis, said lever being swingable between an engaging position, in which the engaging member is in engagement with the elongted flexible member so as to clamp the same between the engaging member and the guide surface, and a releasing position, in which the engaging member releases the flexible member, and an operating device which is movably mounted in the frame and interacts with the lever so as to move the engaging member between its engaging and releasing positions when the oeprating device is moved between a locking position and a releasing position, respectively, and vice versa, the operating device including a force-transmitting member for force-transmittingly cooperating with the engaging member so as to press the engaging member into a tighter engagement with the flexible member, when the oeprating device is moved towards and beyond the locking position of the operating device.

As in the known structure, the locking of the flexible member in the gripping device according to the invention is effected by manually moving the operating device to its locking position, whereby the lever is swung in a direction so as to move the engaging member towards the guide surface and into engagement with the flexible member. In the gripping device according to the invention, however, a continued movement of the operating device beyond its locking position will cause the force-transmitting member to directly force the engaging member into tight engagement with the flexible member whereby a strong locking effect may be obtained without delay.

The operating device may, for example, be in the form of a toggle joint or another force transmitting mechanism with such a mechanical advantage that the lever may be moved without requiring an unacceptable large manual force. However, in a preferred embodiment, the operating device comprises an eccentric cooperating with the lever and connected to an operating handle. The eccentric may then preferably cooperate with the lever so as to move the eccentric through a dead centre position when the operating handle or grip and the eccentric mounted thereon are swung between the locking position and the releasing osition, whereby the locking and releasing positions become stable. The eccentric may engage with an abutment surface on the outer side of the lever, but in a preferred embodiment the eccentric engages with a cut-out or opening formed in the lever, whereby the lever will be swung in opposite directions when the operating handle is moved towards the locking position and the releasing position, respectively.

The mechanical advantage obtained in the gripping device between the operating handle and the engaging member may be increased in that the eccentric may cooperate with the lever at one end thereof, while the swinging axis of the lever is located at the other end thereof. The longitudinal direction of the lever preferably forms an acute angle with the part of the guide surface arranged opposite to the engaging member, and, as an example, the engaging member may then be arranged displaceably in the longitudinal direction of the lever. However, in the preferred embodiment of the gripping device according to the invention, the engaging member is an eccentric member mounted swingably on the lever.

To ensure that the engaging member is automatically brought into engagement with the flexible member, even if the operating device is not moved beyond its locking position as explained above, the engaging member may be spring-biassed in a direction towards its engaging position.

The operating device may have a force-transmitting member of any type which, by movement of the operating device beyond its locking position, is directly or indirectly brought into force-transmitting engagement with the engaging member so that the latter is actuated in the desired direction. The force-transmitting member may, for example, be a rack which is brought into engagement with teeth formed on the engaging member.

However, in a preferred embodiment the force transmitting member is a projection which is formed on the operating handle, and which may engage with an abutment surface defined on the engaging member.

BRIEF DESCRIPTION OF THE DRAWINGS

The invention will now be explained in further detail with reference to the drawings, in which.

DESCRIPTION OF A PREFERRED EMBODIMENT

Figure 1:
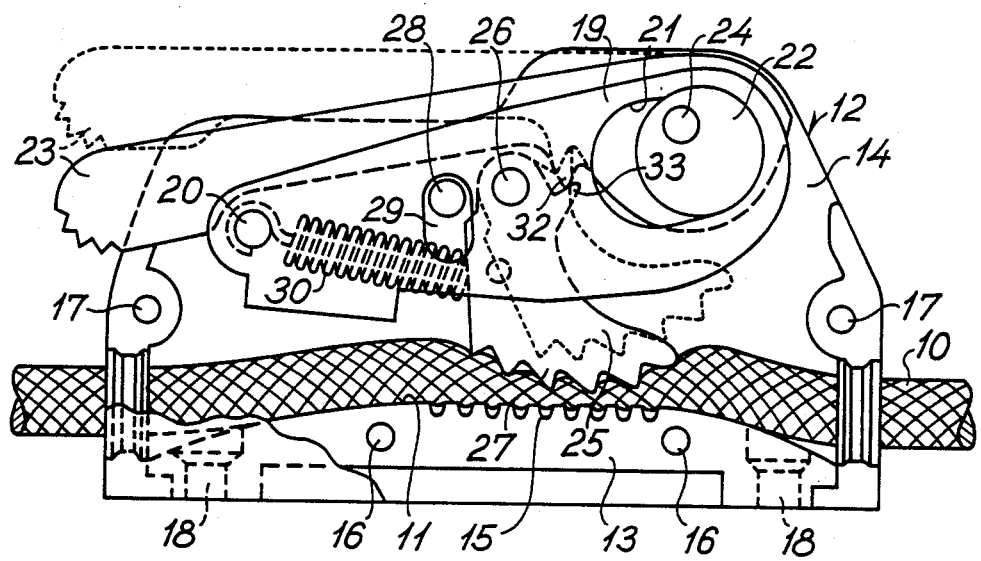
FIG. 1 is a plan view of an embodiment of the invention in a locking position, the front wall of the frame having been removed.

In the embodiment of the gripping device according to the invention shown in the drawing, a flexible member 10, such as a rope or a line, has been passed over a guide surface 11 of a frame 12. The frame 12 has a substantially U-shaped cross-section and comprises a body 13 and two side flanges or side plates 14 arranged on either side thereof. The guide surface 11 is formed on the inner side of the body 13 and is convexly arched, but has a substantially rectilinear engagement part 15 provided with teeth. The side flanges 14 may be fixed to the body 13 by means of bolts or rivets or other fastening means passed through bores 16 in the body, and the side flanges may be interconnected by means of similar connecting means passed through bores 17. Further, the body 13 is provided with bores 18 serving to receive screws or similar fastening members by means of which the gripping device may be fixed to a place of use, for example on a sailing ship.

A lever 19 is mounted between the side flanges or side plates 14 so that it may be swung in a direction towards and away from the guide surface around a pin 20 arranged at one end of the lever 19 and extending between and transversely to the side flanges 14. At its other end, the lever 19 is provided with a cut-out or opening 21 in which an eccentric 22 engages, and the eccentric 22 is mounted on an operating handle or mounting arm 23 which together with the eccentric is arranged between the side flanges 14 and is swingably mounted around a pin 24 arranged on the side flanges and extending transversely thereto. On the lever 19 which may have a U-shaped cross-section opening downward, an engaging member 25 is mounted which is swingable in relation to the lever 19 around an axle or a pin 26, and which has a serrated or otherwise roughened engaging surface 27 which is circular or arched with a centre which is displaced in relation to the swinging axle or pin 26 of the engaging member. The swinging movement of the lever 19 in relation to the frame 12 is restricted by a transverse stop member 28 extending between the side falnges 14 and through a cut-out 29 in the lever 19. A pulling spring 30 extending between the axle or pin 20 and a point onthe engaging member 25 endeavours to bias the engaging member in a clockwise direction in the drawing, i.e. swing the engaging surface 27 in a direction towards the engagement part 15 on the guide surface 11.

Figure 2:
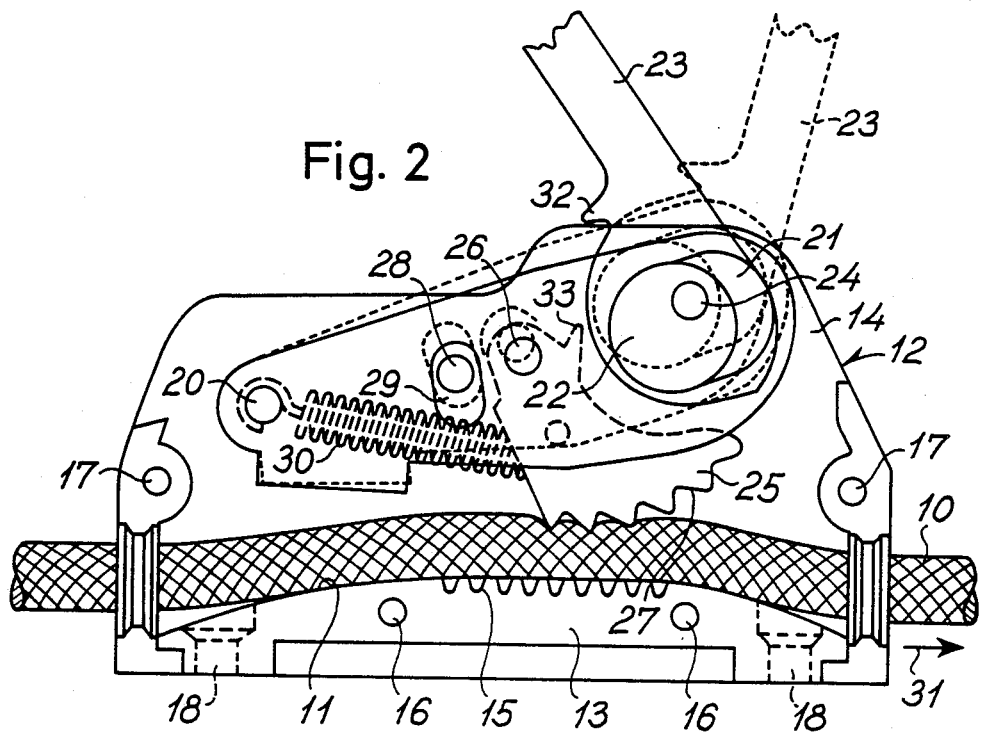
FIG. 2 shows the same as FIG. 1, where the gripping device is in its releasing position.

When the operating handle or grip 23 is swung to the position shown by dotted lines in FIG. 2, the eccentric 22 will be swung so that it swings the lever 19 upwards to an upper position or releasing position which has also been shown by dotted lines in FIG. 2. The stop member 28 will then restrict the swinging movements of the engaging member 25 actuated by the spring 30. In this position of the gripping device the flexible member 10 may freely be moved in both directions, and if desired, another flexible member 10 may be passed through the passage defined by the guide surface 11 and the engaging surface 27. If the operating handle 23 is swung in an anti-clockwise direction to the position shown by solid lines in FIG. 2, the lever 19 will be swung a short distance clockwise to such a position that the engaging member enters into engagement with the flexible member 10 and is swung a short distance anti-clockwise and is thus no longer in contact with the stop member 28. In this position the flexible member 10 may freely be pulled in the direction indicated by an arrow 31 in FIG. 2. However, if the flexible member is pulled in the opposite direction, the engaging member 25 will automatically be swung in a clockwise direction so that the movement of the flexible member is counteracted without any efficient locking being performed. If such an efficient locking is desired, the operating handle 23 is swung to the locking position shown by dotted lines in FIG. 1. If a quick and particularly efficient locking of the flexible member is to be performed, the operating handle 23 is immediately moved on from the locking position to the position shown in solid lines in FIG. 1. The cut-out 21 in the lever and the eccentric 22 are formed so that this movement of the oeprating handle 23 beyond the locking position will not cause further movement of the lever 19, but will cause a projection 32 formed on the operating handle 23 to be brought into force-transmitting engagement with an abutment surface 33 formed on the engaging member 25, which means that the manual force acting on the operating handle 23 during this last part of the swinging movement may be directly transmitted to the engaging member 25 so that it is swung into strong locking engagement with the flexible member 10.

It is obvious that within the scope of the invention various modifications may be made to the embodiment shown in the drawings. For example, the guide surface 11 may be constituted by part of a pulley or block over which the flexible member 10 has been passed. Furthermore, instead of being arranged in a cut-out in the lever, the eccentric 22 may cooperate with the upper side of the lever, and the lever may then be biassed to swing upwards by some spring means.

I claim:

1. A griping device for selectively locking and releasing an elongated flexible member, such as a rope, extending therethrough, said device comprising a frame defining a guide surface for guiding the flexible member, a lever which is swingably mounted in the frame around an axis, an engaging member which is movably mounted on said lever at a location spaced from said axis, said lever being swingable between an engaging position, in which the engaging member is in engagement with the elongated flexible member so as to clamp the same between the engaging member and the guide surface, and a releasing position, in which the engaging member releases the flexible member, and an operating device which is movably mounted in the frame for interacting with the lever, and which comprises an eccentric cooperating with the lever and an operating handle connected to the eccentric, so as to move the engaging member between its engaging and releasing positions when the operating device is moved betweena locking position and a releasing position, respectively, and vice versa, said operating device including a force-transmitting member for force-transmittingly cooperating with the engaging member so as to press the engaging member into a tighter engagement with the flexible member, when the operating device is moved towards and beyond its locking position.

2. A gripping device according to claim 1, wherein the eccentric is in engagement with a cam surface defining a cut-out or opening in the lever.

3. A gripping device according to claim 2, wherein the eccentric is in engagement with the lever at one end thereof, and the swinging axis of the lever is located at an opposite end thereof.

4. A gripping device according to claim 1, wherein the engaging member is an eccentric member which is swingably mounted on the lever.

5. A gripping device according to claim 1, wherein the engaging member is spring-biased towards its engaging position.

6. A gripping device according to any of the claims 1 and 2-5, wherein the force-transmitting member of the operating device is a projection which is formed on the operating handle for engaging with an abutment surface defined on the engaging member.

* * * * *

UNITED STATES PATENT AND TRADEMARK OFFICE
CERTIFICATE OF CORRECTION

PATENT NO. : 4,912,817

DATED : April 3, 1990

INVENTOR(S) : Alf J. Sandreid

It is certified that error appears in the above—identified patent and that said Letters Patent is hereby corrected as shown below:

Column 5, claim 2, line 3, "a cut-out or" should read -- an --.

Signed and Sealed this

Nineteenth Day of March, 1991

Attest:

*Attesting Officer*

HARRY F. MANBECK, JR.

*Commissioner of Patents and Trademarks*